United States Patent [19]

Keskey et al.

[11] Patent Number: 4,666,974
[45] Date of Patent: May 19, 1987

[54] ANTIOXIDANT THICKENING COMPOSITIONS

[75] Inventors: William H. Keskey; Richard A. Willency, both of Midland, Mich.

[73] Assignee: The Dow Chemical Company, Midland, Mich.

[21] Appl. No.: 741,996

[22] Filed: Jun. 6, 1985

[51] Int. Cl.$^4$ ............... C08L 41/00; C08L 33/00; C08L 31/00

[52] U.S. Cl. .................... 524/547; 524/521; 524/522; 524/555; 524/556; 524/558; 524/813; 524/814; 524/817; 524/819; 524/820; 524/833; 525/328.5; 525/328.8; 525/330.2; 526/286; 526/301; 526/307.6; 526/313

[58] Field of Search .......... 526/313, 286, 301, 307.6; 524/555, 556, 813, 814, 817, 819, 820, 833, 547, 521, 522, 558; 525/328.5, 328.8, 330.2

[56] References Cited

U.S. PATENT DOCUMENTS

| | | |
|---|---|---|
| 2,883,351 | 4/1959 | Uraneck et al. . |
| 2,956,046 | 10/1960 | Glavis et al. . |
| 3,035,004 | 5/1962 | Glavis . |
| 3,215,759 | 11/1965 | Milionis et al. . |
| 3,271,891 | 9/1966 | Hancock . |
| 3,290,270 | 12/1966 | Goldberg et al. . |
| 3,317,462 | 5/1967 | Goldberg et al. . |
| 3,418,397 | 12/1968 | Tocker . |
| 3,423,360 | 1/1969 | Huber et al. . |
| 3,436,378 | 4/1969 | Azorlosa et al. . |
| 3,477,991 | 11/1969 | Patton et al. . |
| 3,529,005 | 9/1970 | Barcza . |
| 3,573,253 | 3/1971 | Gray . |
| 3,627,831 | 12/1971 | Emden et al. ............ 524/721 |
| 3,629,197 | 12/1971 | Stiehl . |
| 3,645,970 | 2/1972 | Kleiner ............... 526/313 |
| 3,657,175 | 4/1972 | Zimmerman ............ 526/313 |
| 3,714,122 | 1/1973 | Kline ................. 526/313 |
| 3,723,405 | 3/1973 | Kaplin et al. . |
| 3,894,980 | 7/1975 | DeTommaso ........... 524/833 |
| 3,930,047 | 12/1975 | Dale et al. . |
| 3,951,915 | 4/1976 | Keck et al. ........... 528/194 |
| 3,962,187 | 6/1976 | Kline ................. 526/313 |
| 3,986,981 | 10/1976 | Lyons ................ 526/313 |
| 3,996,198 | 12/1976 | Wang et al. . |
| 4,028,342 | 6/1977 | Dale et al. ............ 526/313 |
| 4,032,598 | 6/1977 | Fujiwara et al. . |
| 4,054,676 | 10/1977 | Weinshenker et al. . |
| 4,080,211 | 3/1978 | Van Paesschen et al. . |
| 4,097,464 | 6/1978 | Kline ................. 526/313 |
| 4,107,144 | 8/1978 | Russell et al. . |
| 4,138,380 | 2/1979 | Barabas et al. ......... 524/833 |
| 4,138,389 | 2/1979 | Edwards . |
| 4,155,955 | 5/1979 | Parks . |
| 4,207,109 | 6/1980 | Campbell et al. . |
| 4,207,253 | 6/1980 | Lorenz et al. . |
| 4,218,392 | 8/1980 | Lorenz et al. . |
| 4,267,365 | 5/1981 | Findeisen . |
| 4,268,641 | 5/1981 | Koenig et al. ......... 524/833 |
| 4,279,809 | 7/1981 | Allan et al. . |
| 4,281,192 | 7/1981 | Jacquet et al. . |
| 4,283,504 | 8/1981 | Campbell et al. . |
| 4,292,195 | 9/1981 | Morris . |
| 4,307,012 | 12/1981 | Serres, Jr. . |
| 4,310,657 | 1/1982 | Serres, Jr. . |
| 4,355,148 | 10/1982 | Layer et al. . |
| 4,384,096 | 5/1983 | Sonnabend ............ 526/313 |
| 4,416,921 | 11/1983 | Dunn ................. 526/323.1 |
| 4,514,552 | 4/1985 | Shay et al. ........... 524/813 |
| 4,540,739 | 9/1985 | Midgley .............. 524/818 |

FOREIGN PATENT DOCUMENTS

| | | |
|---|---|---|
| 808737 | 3/1969 | Canada . |
| 2450504 | 5/1976 | Fed. Rep. of Germany . |
| 0118730 | 9/1981 | Japan ................ 524/817 |
| 1226685 | 3/1971 | United Kingdom . |
| 1498707 | 1/1978 | United Kingdom . |

OTHER PUBLICATIONS

Chemical Abstracts: 76:142095c; 81:92669y; 82:17582g; 84:136079z; 93:133082v; 94:157330w; 96:163300u and 97:24366c:.

Derwent Abstracts: 5830B/32 and 34859K/15.

M. Kato and Y. Takemoto, *J. Polymer Science B.*, 10, 157–159 and 489–491 (1972): Beta-vinyloxy (3,5-di--tertbutyl-4-hydroxy) benzoate was copolymerized.

R. H. Kline and J. P. Miller, *Rubber Chem. Technol.*, 46 96–105 (1973): Hindered phenol alkylene acrylates and acrylamides were made.

G. E. Meyer, R. W. Kavchok, and F. J. Naples, *Rubber Chem.*, 46 106–114 (1973): Hindered phenol alkylene acrylates and acrylamides were polymerized in styrene butadiene (SBR) and acrylonitrilebutadiene (NBR) rubbers to the extent of 0.3 to 5 parts by weight based on 100 parts other monomers.

A. H. Weinstein, *Rubber Chem. Technol.*, 50 641–649 and 650–659 (1977): Aromatic disulfides are incorporated by chain transfer reactions.

*Primary Examiner*—Herbert J. Lilling

[57] ABSTRACT

An oxidation resistant thickening composition of matter comprising a liquid emulsion copolymer comprising about 0.10 to 50 parts by weight of at least one antioxidant monomer and at least 20 parts by weight of at least one unsaturated carboxylic acid monomer is prepared and used.

56 Claims, No Drawings

ANTIOXIDANT THICKENING COMPOSITIONS

BACKGROUND OF THE INVENTION

This invention generally relates to thickening and stabilizing compositions of matter, compositions comprising thickening and stabilizing compounds and processes for thickening and stabilizing compositions of matter. More particularly, the invention relates to thickened compositions which are stabilized against the effects of oxidation or aging by the incorporation of antioxidant monomers into the polymeric thickeners.

Thickeners are commonly used in a wide variety of coating compositions, including latex paints. An effective thickener must be compatible with the overall composition. In the case of systems such as latexes, the thickener needs to be in a form which will not destabilize the dispersion of the latex particles.

Many types of thickeners are used. Water soluble thickeners include natural gums and resins like gum arabic, starch products, dextrins, alginates tragacanths and other such compounds. Synthetic thickeners include cellulose derivatives, polyvinyl alcohols, polyacrylamides, polyvinylpyrrolidone, various polyethers and their copolymers as well as polyacrylic acids and their salts. Some acrylic acid thickeners are described in U.S. Pat. Nos. 2,883,351; 2,956,046; 3,035,004; and 3,436,378.

A wide variety of oxidation stabilizers have been used for polymer-containing compositions, including amines, phenols, phosphites, sulfides, and metal salts. Hindered phenol antioxidants are frequently preferred because of their relatively slight tendency to stain or discolor. Compatibility with the variety of systems to be stabilized against oxidation has become an important factor. There is the need to overcome the tendencies of the antioxidant to migrate, evaporate, or separate from such systems as solid polymers or to form localized concentrations or to leaching from the systems when exposed to conditions like dry cleaning solvents, water, washing, weather or other forces which would encourage depletion of the antioxidant from the protected system. To control migration, evaporation and leaching in polymer systems it has been considered desirable to bind the antioxidants into the polymers either by copolymerization or, more often, by grafting.

Only a small portion of the approaches to solving the problems of forming antioxidants in polymeric form involve the use of antioxidant monomers having addition polymerizable unsaturation because these compounds have been difficult to make and purify as well as to polymerize in concentrations sufficient to impart antioxidant function to systems in which they might be used. Antioxidants like hindered phenols tend to be free radical scavengers or inhibitors; thus, they tend to inhibit free radical polymerization. Producing copolymers of hindered phenol monomers has often proven complex and expensive. Addition copolymers of most hindered phenol antioxidant monomers have been limited to less than about 10 percent antioxidant monomer (see U.S. Pat. No. 3,627,831, H. Huber-Emden, et al., Dec. 14, 1971; and *Rubber Chem. Tech.*, 46, pp. 96-105, 106-114 (1973); R. Levy, *Rev. Gen. Caout, Plast.*, 51(4), pp. 243-247 (1974).

In U.S. application Ser. No. 298,688, filed Sept. 2, 1981 and now abandoned, Mark R. Johnson taught an improved method of producing an addition polymerizable antioxidant with high activity, which need not have electronattracting groups on the phenolic ring. In the pertinent part, this process employs an unsaturated isocyanatoalkyl ester reacted with an active hydrogen of an antioxidant compound to form a urethane type of linkage. The reaction product has unsaturation for addition polymerization as well as the active antioxidant functionality. That application did not disclose incorporation of high levels of antioxidant monomers or use of the monomers in thickening compositions.

The inclusion of at least one unsaturated carboxylic acid monomer facilitates incorporation of antioxidant monomers into a copolymer, especially when the copolymer is produced in an emulsion system. At least 10 percent by weight of antioxidant may be included in the copolymer chain using the same polymerization techniques that have proven effective for monomers which do not inhibit oxidation or polymerization, when at least 15 percent by weight of an unsaturated carboxylic acid monomer is used. The use of at least 20 percent by weight of unsaturated carboxylic acid monomer with at least 0.10 percent by weight of antioxidant monomer produces a copolymer which acts as both a thickener and an antioxidant for the systems into which it is incorporated. When these copolymers are produced in an emulsion system, they are compatible with latexes. After incorporation into latexes or other aqueous systems, the copolymers may be solubilized by neutralization with base.

SUMMARY OF THE INVENTION

In one aspect, the present invention is an oxidation resistant thickening composition of matter comprising a liquid emulsion polymer comprising an aqueous emulsion copolymer comprising (a) about 0.10 to 50 parts by weight per hundred parts by weight of total monomer of at least one antioxidant monomer having an addition polymerizable double bond of the formula:

wherein Z is an antioxidant functionality, Al is a divalent group comprising at least one member from the group consisting of alkyl, ether, thioether, ester, thioester, amide, carbamate groups, or urethane-type linkages, E is a group having addition polymerizable unsaturation and (b) at least 20 parts by weight of at least one unsaturated carboxylic acid monomer.

In another aspect, the invention is a process of thickening compositions of matter comprising adding an emulsion polymerized monomer system comprising (a) about 0.10 to 50 parts by weight per hundred parts by weight of total monomer of at least one antioxidant monomer having an addition polymerizable double bond of the formula:

wherein Z, Al and E are defined above, and (b) at least 20 parts by weight of at least one unsaturated carboxylic acid monomer and supplying sufficient base to raise the pH of the composition to at least 6.5.

These new aqueous emulsion polymers provide stable liquid emulsions having low viscosity and relatively high solids content under acidic conditions, but become efficient polymeric thickeners for many aqueous systems when treated with base to achieve a pH of at least 6.5, preferably at least 7 and most preferably at least 8.5. The neutralization can occur in situ when the liquid emulsion polymer is blended with an aqueous solution containing a suitable base. Or if desired for a given application, pH adjustment by partial or complete neutralization can be carried out before or after blending the liquid emulsion polymer with an aqueous product.

DETAILED DESCRIPTION OF THE INVENTION

A. Antioxidant Monomer

The antioxidant thickening compositions of matter of the invention comprises emulsion polymerized monomer systems comprising (a) at least 0.10 to 50 parts by weight per hundred parts by weight of total monomer of at least one antioxidant monomer having an addition polymerizable double bond of the formula:

$$Z-Al-E \qquad \text{Formula 1}$$

wherein Z, Al and E are defined above, and (b) at least 20 parts by weight of at least one unsaturated carboxylic acid monomer.

In Formula I above, E preferably comprises an alkyl group of the formula:

$$-R^4-CR^5=CHR^6 \qquad \text{Formula 2}$$

wherein $R^4$ is a divalent alkyl group of 1 to 4 carbon atoms or nothing and each of $R^5$ and $R^6$ is chosen from the group consisting of H or an alkyl group of 1 to 4 carbon atoms such that the double bond is addition polymerizable.

More preferably, E comprises an ester group of the formula:

$$-O-CO-R^4-CR^5=CHR^6 \qquad \text{Formula 3}$$

wherein $R^4$ is a divalent alkyl group of 1 to 4 carbon atoms or nothing and each of $R^5$ and $R^6$ is chosen from the group consisting of H or an alkyl group of 1 to 4 carbon atoms such that the double bond is addition polymerizable.

In Formula 1, the antioxidant functionality Z preferably comprises a hindered phenol group having at least one alkyl substituent ortho to the hydroxyl group, preferably having at least one branched or cyclic lower alkyl substituent, preferably of at least 3 carbon atoms, ortho to the hydroxy group.

More preferably, Z comprises:

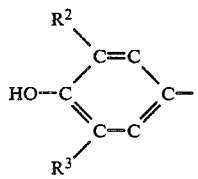

Formula 4 wherein $R^2$ is an alkyl group, $R^3$ is a hydrogen or alkyl group such that the hydroxyl group is sufficiently hindered to have antioxidant function.

Most preferably, Z comprises a 2,6-di-tert-butyl phenol group.

In Formula 1, —Al— preferably comprises $$-A2-A3-A4- \qquad \text{Formula 5}$$

wherein A2 is $-(CH_2)_k$, $-S-$, $-O-$, $-CH_2O-$, $-CH_2S-$, $-(CH_2)_l-S-$, or $-(CH_2)_m-O-$, where k, l, and m are independently chosen from the integers 1 to 4; more preferably, A2 comprises $-S-$ or $-(CH_2)_2-$; each of A3 and A4 is independently a divalent group comprising at least one member from the group consisting of alkyl, ether, thioether, ester, thioester, amide, carbamate groups, or urethane-type linkages. Preferably, A4 is a urethane-type linkage.

The preferred antioxidant monomer is O-[2ethyl(3,5-di-tert-butyl, 4-hydroxyphenyl-3-thiopropanoate)], N-(2-ethylmethacrylate)carbamate or 2-(((2-(-3-((3,5-bis-(1,1-dimethylethyl)-4-hydroxyphenyl)thio)-1-oxo-propoxy)ethoxy)carbonyl)amino)ethyl 2-methyl-2-propenoate (henceforth referred to as TBPTMC) of the formula

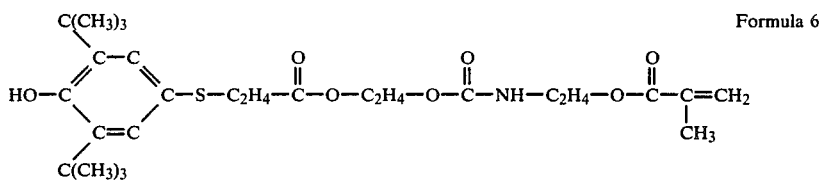

Formula 6

The preparation of the above compound and similar hindered phenol antioxidants having thioalkanoate substituents which may be further substituted with urethane and addition polymerizable carboxylic ester groups were disclosed by M. R. Johnson and M. Fazio in U.S. application Ser. No. 579,237, filed Feb. 13, 1984, which is incorporated by reference. A wider range of hindered phenol antioxidants having addition polymerizable unsaturation in their side chains and which are useful in this invention may be prepared by the reaction of an antioxidant having an active hydrogen and an isocyanatoalkyl ester of an ethylenically unsaturated carboxylic acid as is disclosed by M. R. Johnson in U.S. application Ser. No. 298,688, filed Sept. 2, 1984, and now abandoned which is incorporated by reference. That application states the definition of urethane-type linkage employed herein: the term urethane-type linkage is meant to include not only a true urethane linkage wherein an isocyanate is reacted with an organic hydroxyl group, but also to include the reaction of an isocyanate with any active hydrogen moiety (generally any hydrogen moiety which will react with an isocyanate group, including, for example, amines, alcohols, thiols, carboxylic acids and carboxamides). Neither application taught copolymers of those compounds with addition polymerizable carboxylic acid monomers, nor incorporation of high concentrations of antioxidant monomers in copolymers.

Specific examples of useful addition polymerizable hindered phenol to which the invention is not limited are O -[2-ethyl(3,5-di-tert-butyl, 4-hydroxyphenyl-3-thiopropanoate)], N-(2-ethyl acrylate) carbamate; O-[2-ethyl(3,5-di-tert-butyl, 4-hydroxyphenyl-3-thiopropanoate)], N-(2-ethyl methacrylate) carbamate; O-[2-ethyl(3,5-di-iso-butyl, 4-hydroxyphenyl-3-thiopropanoate)], N-(2-ethyl acrylate) carbamate; O-[2-ethyl(3,5-di-iso-butyl, 4-hydroxyphenyl-3-thiopropanoate)], N-(2-ethyl methacrylate) carbamate; O-[2-ethyl(3,5-di-tert-butyl, 4-hydroxyphenyl-3-thiopropanoate)], N-(methyl acrylate) carbamate; O-[2-ethyl(3,5-di-tert-butyl, 4-hydroxyphenyl-3-thiopropanoate)], N-(methyl methacrylate) carbamate; O-

[2-ethyl(3,5-di-tert-butyl, 4-hydroxyphenyl-3-thiopropanoate)], N-(2-propyl acrylate) carbamate; O-[2-ethyl(3,5-di-tert-butyl,4-hydroxyphenyl-3-thiopropanoate)], N-(2-propyl methacrylate) carbamate; O-[2-ethyl(3,5-di-tert-butyl,4-hydroxyphenyl-3-thiopropanoate)], N-(3-propyl acrylate) carbamate; O-[2-ethyl(3,5-di-tert-butyl, 4-hydroxyphenyl-3-thiopropanoate)], N-(3-propyl methacrylate) carbamate; O-[2-ethyl(3,5-di-tert-butyl,4-hydroxyphenyl-3-thio2-methylpropanoate)], N-(2-ethyl acrylate) carbamate; O-[2-ethyl(3,5-di-tert-butyl, 4-hydroxyphenyl-3-thio-2-methylpropanoate)], N-(2-ethyl methacrylate) carbamate; O-[2-ethyl(3,5-di-iso-butyl, 4-hydroxyphenyl-3-thio-2-methylpropanoate)], N-(2-ethyl acrylate) carbamate; O-[2-ethyl(3,5-di-iso-butyl, 4-hydroxyphenyl-3-thio-2-methylpropanoate)], N-(2-ethyl methacrylate) carbamate; O-[2-ethyl(3,5-di-tert-butyl, 4-hydroxyphenyl-3-thio-2-methylpropanoate)], N-(methyl acrylate) carbamate; O-[2-ethyl(3,5-di-tert-butyl, 4-hydroxyphenyl-3-thio-2-methylpropanoate)], N-(methyl methacrylate) carbamate, O-[2-ethyl(3,5-di-tert-butyl, 4-hydroxyphenyl-3-thio-2-methylpropanoate)], N-(2-propyl acrylate) carbamate; O-[2-ethyl(3,5-di-tert-butyl, 4-hydroxyphenyl-3-thio-2-methylpropanoate)], N-(2-propyl methacrylate) carbamate; O-[2-ethyl(3,5-di-tert-butyl, 4-hydroxyphenyl-3-thio-2-methylpropanoate)], N-(3-propyl acrylate) carbamate; O-[2-ethyl(3,5-di-tert-butyl, 4-hydroxyphenyl-3-thio-2-methylpropanoate)], N-(3-propyl methacrylate)carbamate.

While the range of the polymerizable hindered phenol antioxidant monomers present may be from 0.1 to 50 parts by weight to 100 parts by weight of total monomers present, preferably there is at least 10 parts by weight of the polymerizable hindered phenol antioxidant monomer incorporated in the copolymer with the unsaturated carboxylic acid monomer. More preferably at least 15 parts by weight or at least 20 parts by weight of the antioxidant phenol monomer will be incorporated in the copolymer with the unsaturated acid monomer.

B. Carboxylic Acid Monomer

The emulsion polymer requires about 15 to 60 weight percent based on total monomers present of a three to eight carbon $\alpha,\beta$-ethylenically unsaturated carboxylic acid monomer of the formula:

$$RCH=CR'—COOH \qquad \text{Formula 7}$$

wherein R is H and R' is H or a one to four carbon alkyl group, or $—CH_2COOX$; or R is $—CH_2COOX$ and R' is H or $—CH_2COOX$; or R is $—CH_3$ and R' is H; and X is H or a 1 to 4 carbon alkyl group. At least about 20 parts by weight per 100 parts by weight of total monomer in the copolymer should be made up of these unsaturated carboxylic acid monomers to produce substantial thickening. A range of 20 to 60 parts by weight of at least one $\alpha,\beta$-ethylenically unsaturated carboxylic acid monomer is preferred, with at least 25 parts by weight of the carboxylic acid monomer being preferred, at least 40 parts by weight is more preferred and at least 50 parts by weight most preferred.

Acrylic or methacrylic acid or a mixture thereof with itaconic or fumaric acid are preferred, but crotonic and aconitic acid and half esters of these and other polycarboxylic acids such as maleic acid with 1 to 4 carbon alkanols are also suitable, particularly if used in minor amounts in combination with acrylic or methacrylic acid. For most purposes, it is preferable to have at least about 15 weight percent, more preferably at least about 20 weight percent, and most preferably from about 25 to 60 weight percent of the unsaturated carboxylic acid monomer. However, polycarboxylic acid monomers and half ester can be substituted for a portion of the acrylic or methacrylic acid, e.g., about 1 to 15 weight percent based on total monomers.

C. Other Monomers

The active antioxidant polymers may be made up entirely of hindered phenol and carboxylic acid monomers, but in most of these compositions there will be at least one additional copolymerizable nonionic 2 to 12 carbon $\alpha,\beta$-ethylenically unsaturated monomer selected from the group consisting of the formula:

$$CH_2=CYZ \qquad \text{Formula 8}$$

where Y is H and Z is $—COOR$, $—C_6H_4R'$, $—CN$, $—Cl$, $—OCOR''$, or $—CH=CH_2$; or Y is $CH_3$ and Z is $—COOR$, $—C_6H_4R'$, $—CN$, $—OCOR''$, or $—CH=CH_2$; or Y and Z are Cl; and R is 1 to 8 carbon alkyl or 2 to 8 carbon hydroxyalkyl; R' is H, Cl, Br, or 1 to 4 carbon alkyl; R'' is one to 8 carbon alkyl.

Typical of such monomers are the 1 to 8 carbon alkyl and 2 to 8 carbon hydroxyalkyl esters of acrylic and methacrylic acids including, methylacrylate, ethyl acrylate, propyl acrylate, butyl acrylate, methylmethacrylate, ethyl methacrylate, propyl methacrylate, butylmethacrylate, 2-ethylhexyl acrylate, 2-hydroxyethylacrylate, 2-hydroxybutyl methacrylate, 2-ethylhexylmethacrylate, 2-hydroxyethyl methacrylate, styrene, vinyltoluene, t-butylstyrene, isopropylstyrene, and p-chlorostyrene; vinylacetate, vinylbutyrate, vinylcaprolate; acrylonitrile, methacrylonitrile, butadiene, isoprene, vinyl chloride, vinylidene chloride, and the like. In practice, a monovinyl ester such as ethylacrylate or a mixture thereof with styrene, hydroxyethylacrylate, acrylonitrile, vinyl chloride or vinylacetate is preferred.

D. Copolymerization

The novel emulsion copolymers are conveniently prepared from the above-described monomers by conventional emulsion polymerization techniques at an acid pH lower than about 5.0 using free radical producing initiators, usually in amounts from 0.01 percent to 3 percent based on the total weight of the monomers. The free radical producing initiators conveniently are peroxygen compounds especially inorganic persulfate compounds such as ammonium persulfate, potassium persulfate, sodium persulfate; peroxides such as hydrogen peroxide; organic hydroperoxides, for example cumene hydroperoxide, t-butyl hydroperoxide; organic peroxides, for example, benzoyl peroxide, acetyl peroxide, lauroyl peroxide, peracetic acid, and perbenzoic acid (sometimes activated by water soluble reducing agent such as a ferrous compound or sodium bisulfite); as well as 2,2'-azobisisobutyronitrile.

Optionally, a chain transfer agent and an additional emulsifier can be used. Representative chain transfer agents are carbon tetrachloride, bromoform, bromotrichloromethane, long chain alkyl mercaptans and thioesters such as n-dodecyl mercaptan, t-dodecyl mercaptan, hexadecyl mercaptan, octyl mercaptan, tetradecyl mercaptan, butyl thioglycolate, isooctyl thioglycolate, and dodecyl thioglycolate. The chain transfer agents are used in amounts up to about 10 parts per 100 parts of polymerizable monomers.

Often at least one anionic emulsifier is included in the polymeric charge and one or more of the known nonionic emulsifiers may also be present. Examples of anionic emulsifiers are the alkali metal alkyl aryl sulfonates, the alkali metal alkyl sulfates and the sulfonated alkyl esters. Specific examples of these well known emulsifiers are sodium dodecylbenzene sulfonate, sodium disecondary-butylnaphthalene sulfonate, sodium lauryl sulfate, disodium dodecyldiphenyl ether disulfonate, disodium n-octadecylsulfosuccinamate and sodium dioctylsulfosuccinate.

Optionally, other ingredients well known in the emulsion polymerization art may be included as chelating agents, buffering agents, inorganic salts and pH adjusting agents.

Polymerization at an acid pH lower than about 5.0 permits direct preparation of an aqueous colloidal dispersion with relatively high solids content without problems of undue viscosity. Under these acidic conditions, the carboxylic acid groups are normally in a protonated form which produces an insoluble polymer. On pH adjustment with base, the polymer particles dissolve and thicken the medium. The amount of base required will vary with the amount of carboxylic groups present in the polymer.

Usually the copolymerization is carried out at a temperature between about 60° and 90° C. but higher or lower temperatures may be used. The polymerization is carried out batchwise, stepwise or continuously with batch and/or continuous addition of the monomers in a convenient manner.

The term "liquid emulsion polymer" as applied to the new thickener of this specification means that the thickener is an emulsion polymer because the polymer was prepared by emulsion polymerization even though the polymer per se may be a solid at room temperature.

E. Use as a Thickener

The liquid emulsion polymers described herein are particularly useful as thickeners for a wide variety of water-based compositions including polymer solutions as well as aqueous slurries and colloidal dispersions of water-insoluble inorganic and organic material including compositions such as natural rubber, synthetic or artificial latexes and aqueous products containing such materials.

Synthetic latexes which may be thickened with the liquid emulsion polymers are aqueous colloidal dispersions of water-insoluble polymers prepared by emulsion polymerization of one or more ethylenically unsaturated monomers. Typical of such synthetic latexes are emulsion copolymers of monoethylenically unsaturated compounds such as styrene, methyl methacrylate, acrylonitrile with a conjugated diolefin such as butadiene or isoprene; copolymers of styrene, acrylic and methacrylic esters, copolymers of vinyl halide, vinylidene halide, vinyl acetate and the like. Many other ethylenically unsaturated monomers or mixtures thereof can be emulsion polymerized to form synthetic latexes. Representative monomers are vinyl aromatic monomers such as styrene, α-methylstyrene, t-butylstyrene, chlorostyrene, vinyltoluene; conjugated dienes such as butadiene, isoprene, and 2-chloro-1,3-butadiene; vinyl chloride, vinylidene chloride, acrylonitrile, and methacrylonitrile; acrylic and β-hydroxyalkyl acrylic esters; vinyl acetate, vinyl propionate, ethylene and methyl isopropenyl ketone. Also limited amounts of unsaturated carboxylic acid monomers such as defined by Formula 7 are frequently used in preparing the based polymer for latex paints.

The artificial latexes are latexes which are produced by the dispersion or redispersion of pre-formed water-insoluble polymers or solutions thereof. The artificial latexes are produced by known emulsification processes, e.g., by addition of water with stirring until phase inversion occurs, by high shear mixing with water at elevated temperatures or by dilution of a mixture of water and a water-miscible solvent followed by stripping to remove the solvent. A surfactant is required in the emulsification process unless hydrophilic groups are attached to the polymer in sufficient quantity to assist dispersion but in insufficient quantity to produce water-solubility.

Such artificial latexes are produced from polymers which are not prepared readily from monomers by emulsion polymerization, either because no substantial polymerization at a commercially acceptable rate is obtained under usual emulsion polymerization conditions, such as with isobutene, or because a particular form of the polymerized monomer is desired, for example, stereospecific polyisoprene, stereospecific polybutadiene and the like. Representative pre-formed polymers are polymers and copolymers of the mono-olefins having from 2 to 20 carbon atoms such as ethylene, propylene, 1-butene, 2-butene, isobutene, pentene, hexene, octene, dodecene, hexadecene, octadecene and especially those mono-olefins having up to 8 carbon atoms. Especially common types are the various ethylene/propylene copolymers.

Illustrative of still other polymers which can be converted to artificial latexes are alkyd resins, block and graft copolymers, e.g., styrene/butadiene graft and block copolymers, epoxy resins such as the reaction products of epichlorohydrin and bisphenol-A; and thermosettable vinyl ester resins; e.g., the reaction products of approximately equivalent amounts of a polyepoxide and an unsaturated monocarboxylic acid such as acrylic acid and methacrylic acid or unsaturated fatty acids such as oleic acid.

The thickeners of this invention are advantageous for use with the water-based compositions according to the foregoing description and with compositions containing those materials, especially coating compositions of various types. Mixtures of two or more thickeners may be used, if desired. Of course, the latex polymers used in coating compositions are preferably film-forming at temperatures below about 25° C., either inherently or through the use of plasticizers. Such coating compositions include water-based consumer and industrial paints; sizing, adhesives and other coatings for paper, paperboard, textiles, and the like.

The novel liquid emulsion polymers described herein are compatible with most latex paint systems and provide highly effective and efficient thickening. Suitable results are obtained using about 0.05–10.0 weight percent of the liquid emulsion polymer based on total weight of solids, and preferably about 0.1–5.0 weight percent. Usually these latex coating compositions contain added pigments, fillers and extenders such as titanium dioxide, barium sulfate, calcium carbonate, clays, mica, talc, silica and the like.

The aqueous compositions thickened with the liquid emulsion polymers of this invention preferably are those in which any dispersing or solvating liquid present consists of greater than 50 percent by weight of water.

F. Thickener Addition

The product latex may be mixed with another latex or polymer composition or used alone. The carboxylic acid/antioxidant copolymer may be solubilized by neutralization with a base. The liquid emulsion polymers can be incorporated in latex in several ways:

1. Addition of the emulsion polymer to the final latex as liquid dispersion with subsequent neutralization (e.g., with aqueous $NH_4OH$) to a pH>7.
2. Presolubilization of the dispersion by diluting it with water and then adding sufficient alkali (e.g., $NH_4OH$ or NaOH) with agitation. Once a clear solution has been obtained this can be post added to the final paint.
3. Addition of the thickener to the pigment grind after the pigment has been dispersed and then the addition of sufficient alkali (e.g., $NH_4OH$ or NaOH) to solubilize the thickener. It is recommended that the pigment grind be as dilute as possible prior to solubilization of the thickener dispersion.

These latexes may be used as coatings. Films of these compositions may be cast or solid polymers may be formed by other processes like foaming or molding. Such compositions have a high degree of oxidation resistance as is shown in the examples below.

The following examples are presented to further illustrate but not limit the scope of this invention. All parts and percentages are by weight unless otherwise indicated.

EXAMPLE 1

To a preheated solution of 0.0075 parts by weight of sodium diethylenetriamine pentaacetic acid (Versenex 80 ®) and 2 parts nonylphenoxypoly(ethyleneoxy) phosphate ester emulsifier (GAFAC RE 610 ®) in 374.35 parts of water were added a monomer mixture and an aqueous mixture, concurrently over a period of 4 hours. The monomer mixture was 40 parts by weight of ethyl acrylate, 50 parts methacrylic acid, 10 parts by weight 2-(((2-(3-((3,5-bis(1,1-dimethylethyl)-4-hydroxyphenyl) thio)-1-oxypropoxy)ethoxy)carbonyl)amino)ethyl 2-methyl 2-propenoate (henceforth called TBPTMC), and 6 parts nonylphenoxypoly(ethyleneoxy)$_5$ ethanol (IGEPAL CO-530 ®). The aqueous mixture was 69.8 parts by weight water with 0.002 parts of a 1 percent solution of sodium diethylenetriamine pentaacetic acid (Versenex 80 ®) and 1 part nonyl-phenoxypoly(ethyleneoxy) phosphate ester emulsifier (GAFAC RE 610 ®), 2 parts sodium dodecyldiphenyl ether disulfonate (Dowfax 2A1) in a 45 percent solution, 0.5 parts sodium persulfate and 0.4 parts sodium hydroxide. Agitation, a nitrogen purge and a temperature of 80° C. were maintained. All parts are by weight and represent parts per 100 parts of monomers in the composition.

After a post reaction period of 1.5 hours, the reactor was cooled. The product was removed and filtered through a 200 mesh screen. The resulting latex had a solids content of 19.7 percent. This represented about 99 percent conversion based on solids charged to the system.

EXAMPLE 2

The emulsion polymerization process of Example 1 was repeated for a monomer mixture of 25 parts by weight of ethyl acrylate, 50 parts by weight of methacrylic acid, 6 parts nonylphenoxypoly(ethyleneoxy)$_5$ ethanol (IGEPAL CO-530 ®), and 25 parts TBPTMC.

EXAMPLE 3

The emulsion polymerization process of Example 1 was repeated for a monomer mixture of zero parts by weight of ethyl acrylate, 50 parts by weight of methacrylic acid, 6 parts nonylphenoxypoly(ethyleneoxy)$_5$ ethanol (IGEPAL CO-530 ®), and 50 parts TBPTMC.

EXAMPLE 4

Control, For Comparison Only

The emulsion polymerization process of Example 1 was repeated for a monomer mixture of 50 parts by weight of ethyl acrylate, 50 parts by weight of methacrylic acid, 6 parts nonylphenoxypoly(ethyleneoxy)$_5$ ethanol (IGEPAL CO-530 ®) with no hindered phenol monomer for comparison of this polymer which is not an example of the invention with those which are.

EXAMPLE 5

A 149.8 g sample of Dow Latex XD-30553.01 containing 2.0 percent itaconic acid with no antioxidant present was diluted with 50.2 g water to give a 40 percent solids latex. The pH was adjusted to 9.0 with 28 percent $NH_4OH$. A 4.06 g portion of the product latex of Example 1 was added to the diluted latex, giving a latex with 0.1 percent active antioxidant in the polymers.

The pH was adjusted to 8.5 using $NH_4OH$. The viscosity measured with a LVT Brookfield Viscometer (#3 spindle) was 2220 cps at 12 RPM and 1124 cps at 30 RPM. A film was cast on a glass plate. An accelerated aging study was conducted by heating the film at 130° C. in a forced air oven and observing the yellowing and embrittlement of the film. This film became brittle in the 48th through 60th hours.

EXAMPLE 6

The procedure of Example 5 was repeated using 4.17 g of the product of Example 2 in place of the product of Example 1. The resulting latex had 0.25 percent active antioxidant. At a pH of 8.5 the viscosity of the combined latex measured as in Example 5, was 250 cps at 12 RPM and 220 cps at 30 RPM. The film cast as in Example 5 became brittle in the 48th through 60th hours.

EXAMPLE 7

The procedure of Example 5 was repeated using 4.50 g of the product of Example 3 in place of the product of Example 1. The resulting latex had 0.50 percent active antioxidant. At a pH of 8.5 the combined latex had a viscosity, measured as in Example 5, of 290 cps at 12 RPM and 160 cps at 30 RPM. The film cast as in Example 5 became brittle in the 48th through 60th hours.

EXAMPLE 8

FOR COMPARISON

The procedure of Example 5 was repeated using 4.06 g of the product of Example 4 in place of the product of Example 1. The resulting latex had no active antioxidant monomer. At a pH of 8.5 the combined latex had a viscosity, measured as in Example 5, of 3970 cps at 12 RPM and 1976 cps at 30 RPM. The film cast as in Example 5 became brittle in the 24th through 36th hours. Note that this is not an example of the invention and is given only for comparison.

The above data demonstrate that the polymers comprising at least 10 parts by weight and up to at least 50 parts by weight of hindered phenol antioxidant monomer having an addition polymerizable ethylenically unsaturated group, and 50 parts by weight of at least one unsaturated carboxylic acid monomer can be prepared and are useful in stabilizing and thickening polymer systems. These active antioxidant thickening polymers may be produced in polymerization systems known in the art and are not limited to the ingredients or proportions illustrated in the examples. Rather, the surfactants, emulsifiers, suspension agents, catalysts, bases, or liquid systems in the examples are merely illustrations which may be substituted by similarly functioning compounds. The active antioxidant polymers may be made up entirely of the hindered phenol antioxidant monomer(s) and the carboxylic acid monomer(s) or may contain other monomers copolymerizable with them.

These antioxidant thickening polymers are active whether used alone or whether incorporated into other polymer systems as illustrated. These emulsion polymers are useful as water-soluble thickeners for a wide variety of applications ranging from cosmetics to drilling muds, but particularly for aqueous coating compositions. These systems may be used in any form not limited to latex, solution, emulsion, and solid whether shaped or not. They may be used as or in coatings. These systems may be crosslinked or not. They are especially useful where they will be exposed to oxidizing conditions.

What is claimed is:

1. A process of thickening an aqueous composition of matter comprising adding an emulsion polymerized monomer system comprising:
    (a) about 0.10 to 50 parts by weight per hundred parts by weight of total monomer of at least one antioxidant monomer having an addition polymerizable double bond of the formula:

Z—Al—E wherein Z is an antioxidant functionality comprising a hindered phenol group having at least one alkyl substituent ortho to the hydroxyl group, Al is a divalent group comprising at least one member from the group consisting of alkyl, ether, thioether, ester, thioester, amide, carbamate groups, or urethane-type linkages, E is a group having addition polymerizable unsaturation, and
    (b) at least 20 parts by weight of at least one $\alpha,\beta$-ethylenically unsaturated carboxylic acid monomer, and supplying at least a sufficient amount of base to raise the pH of the aqueous compositon to at least 6.5.

2. The process of claim 1 wherein at least a sufficient amount of base to raise the pH of the aqueous composition to a range of about 7 to 11 is supplied.

3. The process of claim 1 wherein at least a sufficient amount of base to raise the pH of the aqueous composition to a range of about 8.5 to 11 is supplied.

4. The process of claim 1 wherein the aqueous composition of matter thickened is selected from the group consisting of synthetic latexes and artificial latexes.

5. The process of claim 1 wherein there are at least 10 parts by weight per hundred parts by weight of total monomer of the antioxidant monomer having an addition polymerizable double bond.

6. The process of claim 1 wherein there are at least 20 parts by weight per hundred parts by weight of total monomer of the antioxidant monomer having an addition polymerizable double bond.

7. The process of claim 1 wherein there are at least 40 parts by weight per hundred parts by weight of total monomer of at least one $\alpha,\beta$-ethylenically unsaturated carboxylic acid monomer.

8. The process of claim 1 wherein there are at least 50 parts by weight per hundred parts by weight of total monomer of at least one $\alpha,\beta$-ethylenically unsaturated carboxylic acid monomer.

9. The process of claim 1 wherein the amount of $\alpha,\beta$-ethylenically unsaturated carboxylic acid monomer (B) is from about 20 to 60 parts by weight per hundred parts by weight of total monomer.

10. The process of claim 1 wherein E comprises an alkyl group of the formula:

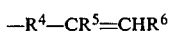

wherein $R^4$ is a divalent alkyl group of 1 to 4 carbon atoms or nothing and each of $R^5$ and $R^6$ is chosen from the group consisting of H or an alkyl group of 1 to 4 carbon atoms such that the double bond is addition polymerizable.

11. The process of claim 1 or 5 wherein E comprises an ester group of the formula:

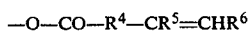

wherein $R^4$ is a divalent alkyl group of 1 to 4 carbon atoms or nothing and each of $R^5$ and $R^6$ is chosen from the group consisting of H or an alkyl group of 1 to 4 carbon atoms such that the double bond is addition polymerizable.

12. The process of claim 5 wherein E comprises an alkyl group of the formula:

wherein $R^4$ is a divalent alkyl group of 1 to 4 carbon atoms or nothing and each of $R^5$ and $R^6$ is chosen from the group consisting of H or an alkyl group of 1 to 4 carbon atoms such that the double bond is addition polymerizable.

13. The process of claim 1, 5, 10 or 12 wherein antioxidant functionality Z comprises:

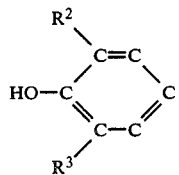

wherein $R^2$ is an alkyl group, $R^3$ is a hydrogen or an alkyl group such that the hydroxyl group is sufficiently hindered to have antioxidant function.

14. The process of claim 13 wherein Z comprises a 2,6-di-tert-butyl phenol group.

15. The process of claim 1 or 5 wherein —Al— comprises

—A2—A3—A4— wherein A2 is —(CH$_2$)$_k$, —S—, —O—, —CH$_2$O—, —CH$_2$S—, —(CH$_2$)$_l$—S—, or —(CH$_2$)$_m$—O—, where k, l, and m are independently chosen from the integers 1 to 4; each of A3 and A4 is independently a divalent group comprising at least one member from the group consisting of alkyl, ether, thioether, ester, thioester, amide, carbamate groups, or urethane-type linkages.

16. The process of claim 15 wherein A2 is —S— or —(CH$_2$)$_2$—.

17. The process of claim 15 wherein A4 is a urethane-type linkage.

18. The process of claim 1 or 5 wherein the antioxidant monomer having an addition polymerizable double bond is 2-(((2-(-3-((-3,5-bis(1,1-dimethylethyl)-4-hydroxyphenyl)thio)-1-oxopropoxy)ethoxy)carbonyl-)amino)ethyl 2-methyl 2-propenoate.

19. The process of claim 1 or 5 wherein the α,β-ethylenically unsaturated carboxylic acid monomer is of the formula:

RCH=CR'—COOH wherein R is H and R' is H or a 1 to 4 carbon alkyl group, or —CH$_2$COOX; or R is —CH$_2$COOX and R' is H or —CH$_2$COOX; or R is —CH$_3$ and R' is H; and X is H or a 1 to 4 carbon alkyl group.

20. The process of claim 19 wherein at least one α,β-ethylenically unsaturated carboxylic acid monomer is selected from the group consisting of acrylic acid and methacrylic acid.

21. The process of claim 20 wherein the monomer system contains about 25 to 50 parts by weight per hundred parts by weight of total monomer of methacrylic acid or a mixture thereof with a minor amount of itaconic acid.

22. The process of claim 1 or 5 wherein the monomer system additionally comprises
(c) at least 15 parts by weight per hundred parts by weight of total monomer of at least one non-ionic, copolymerizable α,β-ethylenically unsaturated monomer of the formula:

CH$_2$=CYZ where Y is H and Z is —COOR, —C$_6$H$_4$R', CN, Cl, —OCOR'', or —CH=CH$_2$; or Y is CH$_3$ and Z is —COOR, —C$_6$H$_4$R', CN, —OCOR'', or —CH=CH$_2$; or Y and Z are Cl; and R is 1 to 8 carbon alkyl or 2 to 8 carbon hydroxyalkyl; R' is H, Cl, Br, or 1 to 4 carbon alkyl; R'' is 1 to 8 carbon alkyl.

23. The process of claim 22 wherein there is at least 25 parts by weight per hundred parts by weight of total monomer of at least one non-ionic, copolymerizable α,β-ethylenically unsaturated monomer (c).

24. The process of claim 23 wherein there is at least 40 parts by weight per hundred parts by weight of total monomer of at least one non-ionic, copolymerizable α,β-ethylenically unsaturated monomer (c).

25. The process of claim 22 wherein at least one non-ionic, copolymerizable α,β-ethylenically unsaturated monomer (c) is selected from the group consisting of 1 to 8 carbon alkyl and 2 to 8 carbon hydroxyalkyl esters of acrylic and methacrylic acids.

26. A thickening composition of matter comprising a liquid emulsion polymer comprising an aqueous emulsion copolymer comprising:
(a) about 0.10 to 50 parts by weight per hundred parts by weight of total monomer of at least one antioxidant monomer having an addition polymerizable double bond of the formula:

Z—A1—E wherein Z is an antioxidant functionality comprising a hindered phenol group having at least one alkyl substituent ortho to the hydroxyl group, A1 is a divalent group comprising at least one member from the group consisting of alkyl, ether, thioether, ester, thioester, amide, carbamate groups, or urethane-type linkages, E is a group having addition polymerizable unsaturation, and
(b) at least 20 parts by weight of at least one α,β-ethylenically unsaturated carboxylic acid monomer.

27. The composition of claim 26 wherein there is additionally sufficient base to raise the pH of a thickened composition to at least 6.5.

28. The composition of claim 26 wherein there is additionally sufficient base to raise the pH of a thickened composition to a range of about 7 to 11.

29. The composition of claim 26 wherein there is additionally sufficient base to raise the pH of a thickened composition to a range of about 8.5 to 11.

30. The composition of claim 26 wherein there are at least 10 parts by weight per hundred parts by weight of total monomer of the antioxidant monomer having an addition polymerizable double bond.

31. The composition of claim 26 wherein there are at least 20 parts by weight per hundred parts by weight of total monomer of the antioxidant monomer having an addition polymerizable double bond.

32. The composition of claim 26 wherein the amount of the α,β-ethylenically unsaturated carboxylic acid monomer (b) is from about 20 to 60 parts by weight per hundred parts by weight of total monomer.

33. The composition of claim 26 wherein there are at least 40 parts by weight per hundred parts by weight of total monomer of at least one α,β-ethylenically unsaturated carboxylic acid monomer.

34. The composition of claim 26 wherein there are at least 50 parts by weight per hundred parts by weight of total monomer of at least one α,β-ethylenically unsaturated carboxylic acid monomer.

35. The composition of claim 26 or 30 wherein E comprises an alkyl group of the formula:

—R$^4$—CR$^5$=CHR$^6$ wherein R$^4$ is a divalent alkyl group of 1 to 4 carbon atoms or nothing and each of R$^5$ and R$^6$ is chosen from the group consisting of H or an alkyl group of 1 to 4 carbon atoms such that the double bond is addition polymerizable.

36. The composition of claim 26 or 30 wherein E comprises an ester group of the formula:

—O—CO—R$^4$—CR$^5$=CHR$^6$ wherein R$^4$ is a divalent alkyl group of 1 to 4 carbon atoms or nothing and each of R$^5$ and R$^6$ is chosen from the group consisting of H or an alkyl group of 1 to 4 carbon atoms such that the double bond is addition polymerizable.

37. The composition of claim 26 or 30 wherein the antioxidant functionality Z comprises a hindered phenol group having at least one branched or cyclic lower alkyl substituent ortho to the hydroxyl group.

38. The composition of claim 26 or 30 wherein the antioxidant functionality Z comprises

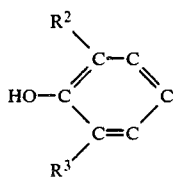

wherein $R^2$ is an alkyl group, $R^3$ is a hydrogen or alkyl group such that the hydroxyl group is sufficiently hindered to have antioxidant function.

39. The composition of claim 38 wherein Z comprises a 2,6-di-tert-butyl phenol group.

40. The composition of claim 26 or 30 wherein —A1— comprises

—A2—A3—A4— wherein A2 is $-(CH_2)_k$, —S—, —O—, —$CH_2O$—, —$CH_2S$—, $-(CH_2)_l-S-$, or $-(CH_2)_m-O-$, where k, l and m are independently chosen from the integers 1 to 4; each of A3 and A4 is independently a divalent group comprising at least one member from the group consisting of alkyl, ether, thioether, ester, thioester, amide, carbamate groups, or urethane-type linkages.

41. The composition of claim 40 wherein A2 is —S— or $-(CH_2)_2-$.

42. The composition of claim 40 wherein A4 is a urethane-type linkage.

43. The composition of claim 26 or 30 wherein the hindered phenol antioxidant monomer having an addition polymerizable double bond is 2-(((2-(3-((3,5-bis(1,1-dimethylethyl)-4-hydroxyphenyl)thio)-1-oxopropoxy)ethoxy)carbonyl amino)ethyl 2-methyl 2-propenoate.

44. The composition of claim 26 or 30 wherein the α,β-ethylenically unsaturated carboxylic acid monomer is of the formula

RCH=CR'—COOH wherein R is H and R' is H or a 1 to 4 carbon alkyl group, or —$CH_2COOX$; or R is —$CH_2COOX$ and R' is H or —$CH_2COOX$; or R is —$CH_3$ and R' is H; and X is H or a 1 to 4 carbon alkyl group.

45. The composition of claim 26 or 30 wherein at least one α,β-ethylenically unsaturated carboxylic acid monomer is selected from the group consisting of acrylic acid and methacrylic acid.

46. The composition of claim 26 or 30 wherein the aqueous emulsion copolymer contains about 25 to 50 parts by weight per hundred parts by weight of total monomer of methacrylic acid or a mixture thereof with a minor amount of itaconic acid.

47. The composition of claim 26 or 30 wherein the aqueous emulsion copolymer additionally comprises at least 15 parts by weight per hundred parts by weight of total monomer of at least one non-ionic, copolymerizable α,β-ethylenically unsaturated monomer of the formula:

$CH_2=CYZ$ wherein Y is H and Z is —COOR, —$C_6H_4R'$, CN, Cl, —OCOR", or —CH=$CH_2$; or Y is $CH_3$ and Z is —COOR, —$C_6H_4R'$, CN, —OCOR", or —CH=$CH_2$; or Y and Z are Cl; and R is 1 to 8 carbon alkyl or 2 to 8 carbon hydroxyalkyl; R' is H, Cl, Br, or 1 to 4 carbon alkyl; R" is 1 to 8 carbon alkyl.

48. The composition of claim 47 wherein there is at least 25 parts by weight per hundred parts by weight of total monomer of at least one non-ionic, copolymerizable α,β-ethylenically unsaturated monmer.

49. The composition of claim 47 wherein there is at least 40 parts by weight per hundred parts by weight of total monomer of at least one non-ionic, copolymerizable α,β-ethylenically unsaturated monomer.

50. The composition of claim 47 wherein at least one non-ionic, copolymerizable α,β-ethylenically unsaturated monomer is selected from the group consisting of 1 to 8 carbon alkyl and 2 to 8 carbon hydroxyalkyl esters of acrylic and methacrylic acids.

51. A thickened aqueous composition having a pH of at least about 6.5 comprising an aqueous composition containing a water-soluble or dispersible material and an effective amount of a liquid emulsion polymer of claim 26.

52. The thickened aqueous compositions of claim 51 wherein the water-soluble or dispersible material is in the form of a synthetic latex or artificial latex.

53. A process for making a thickened aqueous composition which comprises: (1) blending with the aqueous composition a sufficient amount of the liquid emulsion polymer of claim 26 to thicken the aqueous composition and (2) adjusting the pH of the blend to at least about 6.5 as necessary to dissolve the liquid emulsion polymer therein and thus thicken the aqueous composition.

54. The process of claim 1, 5, 10 or 12 wherein the antioxidant functionality Z comprises a hindered phenol group having at least one branched or cyclic lower alkyl substituent ortho to the hydroxyl group.

55. The process of claim 1 wherein at least one alkyl substituent ortho to the hydroxyl group is a branched or cyclic lower alkyl substituent of at least 3 carbon atoms.

56. The composition of claim 26 wherein at least one alkyl substituent ortho to the hydroxyl group is a branched or cyclic lower alkyl substituent of at least 3 carbon atoms.

* * * * *